United States Patent [19]

Perego

[11] Patent Number: 5,393,181
[45] Date of Patent: Feb. 28, 1995

[54] CASSETTE FEED SYSTEM AND METHOD

[75] Inventor: Luciano Perego, Milan, Italy

[73] Assignee: Tapematic U.S.A., Inc., Orlando, Fla.

[21] Appl. No.: 58,486

[22] Filed: May 6, 1993

[30] Foreign Application Priority Data

May 8, 1992 [IT] Italy ............... MI92 A 001098

[51] Int. Cl.⁶ .................. B65G 59/06; B65G 65/38
[52] U.S. Cl. .................... 414/416; 198/395;
198/400; 414/797.9; 414/767
[58] Field of Search ............ 414/416, 767, 797.9,
414/798.1; 198/395, 400

[56] References Cited

U.S. PATENT DOCUMENTS

| 2,431,320 | 11/1947 | Fischer ............... | 414/416 |
|---|---|---|---|
| 2,652,139 | 9/1953 | Baehr et al. ............... | 198/400 |
| 3,258,808 | 7/1966 | Ashford ............... | 414/416 X |
| 3,273,723 | 9/1966 | Andersen ............... | 414/416 X |
| 4,162,018 | 7/1979 | Arya ............... | 414/416 X |
| 4,332,355 | 6/1982 | Zopfy et al. ............... | 242/56 R |
| 4,383,795 | 5/1983 | Wakamatsu et al. ............... | 414/416 X |
| 4,426,184 | 1/1984 | Boyland ............... | 414/797.9 X |
| 4,438,468 | 3/1984 | Kamei et al. ............... | 360/92 |
| 4,595,327 | 6/1986 | Woodley ............... | 198/395 X |
| 4,629,138 | 12/1986 | Kubo ............... | 242/56 R |
| 4,966,521 | 10/1990 | Frye et al. ............... | 414/797.9 X |
| 5,009,305 | 4/1991 | Auld et al. ............... | 198/395 |
| 5,050,723 | 9/1991 | Herzog ............... | 198/400 X |
| 5,236,078 | 8/1993 | Gross et al. ............... | 198/395 |

FOREIGN PATENT DOCUMENTS 28123 3/1981 Japan ............... 414/797.9

Primary Examiner—David A. Bucci
Attorney, Agent, or Firm—Curtis, Morris & Safford; Edgar H. Haug; Adam L. Brookman

[57] ABSTRACT

A feed unit having a storage station in which a plurality of trays each carrying a plurality of cassette rows disposed consecutively in side-by-side relation is manually stacked. A first pusher mechanism moves the lowermost tray in the stack along a slide track, towards a linear feeder. An abutment wall stops the movement of trays along the slide track when a cassette row reaches a predetermined loading position, so that it is picked up by a transport arm that will deposit it on the linear feeder. A third pusher mechanism picks up the individual cassettes from the linear feeder and sends them to an output conveyor.

17 Claims, 2 Drawing Sheets

CASSETTE FEED SYSTEM AND METHOD

FIELD OF INVENTION

The present invention pertains to a system and method for feeding cassettes to cassette handling machines, and more particularly to a system and method for feeding tape cassettes to automatic tape loading machines.

BACKGROUND OF THE INVENTION

In the industrial process for producing audio and video tape cassettes, automatic machines which wind tape into cassettes are widely used. In these cases, when high productivity is required, the loading machines are typically supplied with empty cassettes by way of a supply conveyor which brings cassettes into a position in which they can be transferred to the tape loading machine.

In one known system and method, an operator manually deposits a row of cassettes, picked up from a packing tray onto a linear feed conveyor. The output end of the feed conveyor opens perpendicularly onto a supply conveyor such that the cassettes are dropped one after another onto the supply conveyor. The cassettes are then carried to the loading machines on the supply conveyor.

While satisfactory for feeding to cassette loading machines, feed systems and methods of the above type rely on significant manpower to pick up the individual cassette rows from the trays and place them onto the linear feed conveyor. The linear feed conveyor, because of space constraints, generally cannot hold more than two or three cassette rows. When the high production speed reached by loading machines is taken into account, the cassettes on the linear feed conveyor discharged onto the supply conveyor within a very short lapse of time, i.e., as little as one minute or less. The constant presence of one or more operators is therefore necessary to maintain a constant supply of cassettes.

In an attempt to solve this problem, feed units have been conceived in which the linear feed conveyor is vertically rather than horizontally oriented along which a plurality of support and drive elements are distributed. Each of the support and drive elements supports a cassette row to be deposited on the supply conveyor, in order to enable them to be raised towards the output end which is located at a position vertically displaced from the supply conveyor.

The vertically-oriented linear feed conveyor is capable of engaging a greater number of cassette rows than the linear feed conveyor extending horizontally, within the same space. However, this configuration does not eliminate the necessity of an operator since cassette rows still must be manually picked up from the trays and put onto the feed conveyor.

Feeders have also been provided which comprise a turret rotating about a vertical axis, provided with a plurality of circumferentially distributed compartments, capable of engaging one or more cassette rows drawn from a tray. Transfer means, such as a pusher mechanism movable in a radial direction with respect to the turret base, pick up the individual cassettes from one of the engagement compartments disposed in alignment with the output conveyor, to transfer cassettes to the supply conveyor.

When no more cassettes are present in the engagement compartment, the turret is rotated, so that the cassettes in the adjacent compartment can be acted upon by the transfer means.

This solution also involves significant use of manpower. Cassette rows must still be individually picked up from the corresponding trays, and the turret cannot hold a sufficient amount of cassettes to allow for continuous operation for any length of time.

SUMMARY OF THE INVENTION

The primary object of the present invention is to solve the above problems by providing a system and method capable of drastically reducing the need for human intervention when empty cassettes are to be supplied.

The foregoing and other objects, which will become more apparent in the course of the present description, are substantially attained by a cassette feed system and method comprising a storage station designed to engage a plurality of trays stacked one on top of another and each carrying a plurality of cassette rows disposed parallelly in side-by-side relation, a slide track extending horizontally from the storage station base towards a linear feeder, pushing means for moving the individual trays along the slide track, from the storage station to the linear feeder, stop means for stopping the progress of individual trays on the slide track when one of the cassette rows reaches a predetermined pick-up position, and pick-up means for picking up a row of cassettes from a tray on the slide track and depositing the same cassette row onto the linear feeder.

In the embodiment described, the present invention is designed to be combined with automatic cassette loading machines. However, the invention can be also used with machines adapted to carry out different operations, such as audio or video cassette recording or cassette boxing or labeling.

DETAILED DESCRIPTION

Figure 1:
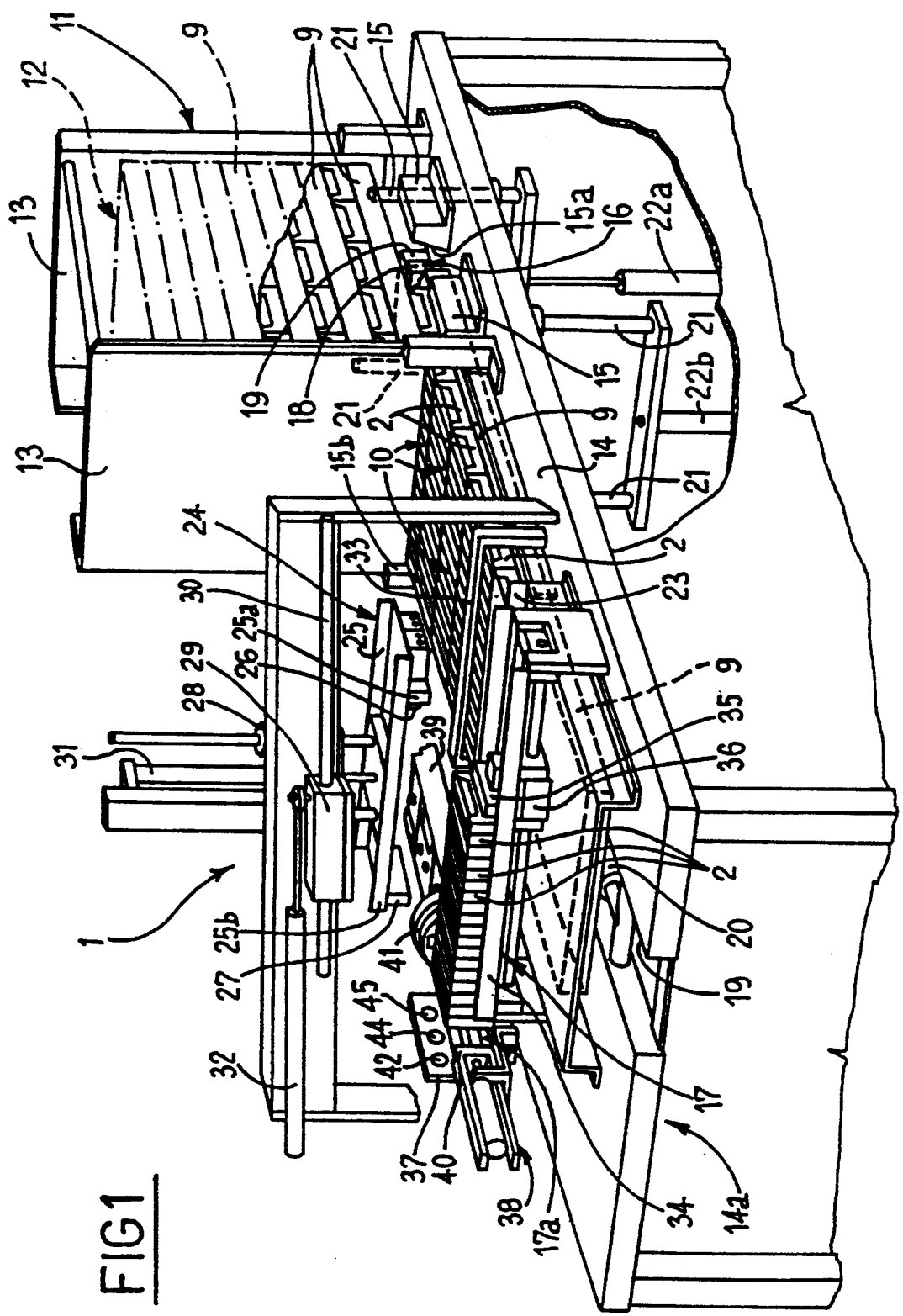
FIG. 1 is a perspective view of a feed unit made in accordance with one embodiment of the present invention.

Referring to the drawings, a tape cassette feed unit for automatic machines in accordance with the present invention is generally identified by reference numeral 1.

In the embodiment described, the feed unit 1 is arranged to feed a plurality of empty tape cassettes 2 in a suitable manner to one or more automatic cassette loading machines (not shown).

Figure 3:
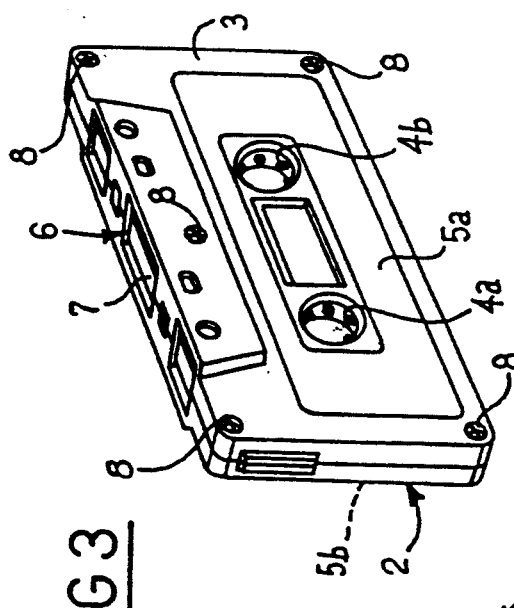
FIG. 3 is a perspective view of an audio cassette.

More particularly, in the embodiment shown, the feed unit 1 operates on audio cassettes 2 of the type usually referred to as "Philips" cassettes. Referring particularly to FIG. 3, these audio cassettes each have a casing 3 containing two winding hubs 4a, 4b accessible through openings formed at the opposite faces 5a, 5b of the casing 3. An access opening 6 is also defined along the front side of the casing 3. When the cassettes are "empty" a leader 7 is connected to the winding hubs 4a, 4b at its opposite ends and is designed to be cut and spliced to magnetic use tape during the loading process carried out by the loading machine. Each cassette 2 may also include fastening screws 8, visible on one of the faces 5a or 5b. These screws are often used for assembling the casing 3.

When empty cassettes 2 are shipped to a party for filling with tape, the cassettes 2 are normally packed in trays 9 made of paperboard or other suitable material. In greater detail, cassettes 2 are typically placed in trays 9 in several rows 10 disposed consecutively, in side-by-side relation. In the embodiment described, the cassettes 2, forming each row 10, are disposed with their faces 5a, 5b oriented in alternating directions with their access openings 6 alternately oriented downwardly and upwardly. The fastening screws 8 of all cassettes 2 are generally oriented according to a predetermined direction, but, some cassettes 2 may be turned in the opposite way.

The feed unit 1 comprises a storage station 11 for holding a plurality of trays 9 carrying rows 10 of cassettes 2. The trays 9 are piled up, one on top of another, so as to form a stack generally denoted by 12, between at least two holding walls 13. The tray 9, put at the base of the stack 12, rests on a horizontally disposed slide track 14 which has a longitudinal extension. Preferably, the tray 9, reaching the slide track 14, is engaged by contact, by at least one element 15 fastened to the slide track and having a vertically inclined front face 15a.

The front face 15a interacts with a lower longitudinal edge of the tray 9 to guide it against a locator element 15b operating on the opposite side with respect to element 15.

Pushing means 16 acts along the slide track 14 shifting the bottom-most trays 9 from the storage station 11 towards a linear feeder 17 extending transversely to the slide track 14 in a slightly raised position relative to the trays 9 thereon.

The pushing means 16 comprises at least one pusher member 18 projecting upwardly from the slide track 14 through a slot 19 formed lengthwise therein. A control actuator 20 located under the slide track 14 acts on the first pusher member 18 for moving it between first and second positions, such that when said pusher member 18 is in its second position, the bottom-most tray 9 is completely disengaged from the storage station 11.

A plurality of auxiliary supporting elements 21 are combined with the storage station 11. The auxiliary supporting elements 21 are selectively movable between a rest position in which they are substantially retracted under the slide track 14, and an operating position in which they project vertically from the slide track for supporting the trays 9 stacked in the storage station 11. At least two pairs of these auxiliary supporting elements 21 are provided, which are spaced apart along slide track 14. The auxiliary supporting elements 21 are individually movable from the rest position to the operating position upon command of respective fluid-actuated cylinders 22a and 22b. The sequential intervention of the auxiliary supporting elements 21 enables the trays 9 stacked upon each other, to be properly supported, when the pusher member 18 acts on the bottom-most tray 9. The supporting elements 21 are operated sequentially to support the stack of trays 9 in the storage station 11 as the pusher member 18 moves from its first rest position, through intermediate operating positions to the second, limit position. Only when the pusher member 19 has returned to its first rest position, is the final auxiliary supporting element 21 lowered to its rest position to allow a new tray 9 to rest on the slide track 14.

Also associated with on the slide track 14 is stop means 23 arranged to stop the progress of the individual trays 9 when one of the cassette rows 10 reaches a predetermined pick-up position that, in one embodiment, is located immediately upstream of the linear feeder 17. Preferably this stop means comprises at least a horizontal abutment wall 23, extending transversely over the slide track 14 offering an abutment seat for the trays 9 moving on the slide track 14.

Due to the presence of the wall 23, the displacement of the pusher member 18 from the first to the second limit position takes place according to a sequence of movement steps in succession, each of which substantially corresponds to the width of a cassette row 10. Optionally microswitches or other sensor means (not shown) may be disposed near the abutment wall 23 to control the deactivation of the control actuator 20 from the moment that one of the rows 10 touches the abutment wall to the moment that the row is picked up from the tray 9.

As can be seen from FIG. 1, the abutment wall 23 is spaced apart from the slide track 14 at a distance greater than the tray height, so that it can act on the cassette rows 10 without interfering with the tray displacement. When all the cassette rows 10 have been removed from a tray 9, the tray, urged by the next trays 9, falls from a terminal end 14a of the slide track 14.

Extraction of the cassette rows 10 from trays 9 is carried out by a transport arm 24 mounted above the slide track 14 and linear feeder 17. The transport arm 24 preferably moves in a path oblique to the longitudinal extension of the slide track 14 and the linear feeder 17, between a grasping position in which it picks up a cassette row 10 from a corresponding tray 9, and a deposit position in which it puts the same row 10 down on the linear feeder 17.

The transport arm 24 comprises a supporting plate 25 that, when operating, extends over a cassette row 10. The supporting plate 25 carries, at one end 25a thereof, one or more gripper elements 26 simultaneously movable between a work position in which they act on the cassette row 10 to hold it against a locator member 27 fastened to a second end 25b of the supporting plate, and a rest position in which they are spaced apart from the cassette row 10 to disengage the cassette row from the transport arm 24 when the arm is in the deposit position.

The transport arm 24 is moved between the grasp position and the deposit position via one or more vertical guides 28 integral with a carriage 29, which is horizontally movable along a guide bar 30 extending above the slide track 14 and linear feeder 17. First and second fluid-actuated cylinders 31, 32, acting between the carriage 19, the arm 24, the guide bar 30 and the carriage, respectively, drive the transport arm 24 between the pick-up position and the deposit position.

When the transport arm 24 reaches the pick-up position, the gripper elements 26, initially at the rest position, are brought to the operating position to cause the engagement of the cassette row 10 located against the abutment wall 23. Then, the first fluid-actuated cylinder 31 lifts the transport arm 24, which extracts the cassette row 10 from the tray 9. During this step, an auxiliary locator bar 33 which extends horizontally above the cassette row 10 which is next to the row in the pick-up position, prevents the cassettes 2 of this adjacent row from being taken along with those carried by the arm 24.

Subsequently, the second fluid-actuated cylinder 32 brings the transport arm 24, and consequently the cassette row 10 picked up by the arm, to a position above the linear feeder 17. When all of the cassettes 2, previously deposited on the linear feeder 17 are exhausted, the first fluid-actuated cylinder 31, driven by an activation sensor 45 through a microprocessor (not shown), will lower the transport arm 24 to the deposit position, so that the new cassette row 10 can be released on the feeder.

Figure 2:
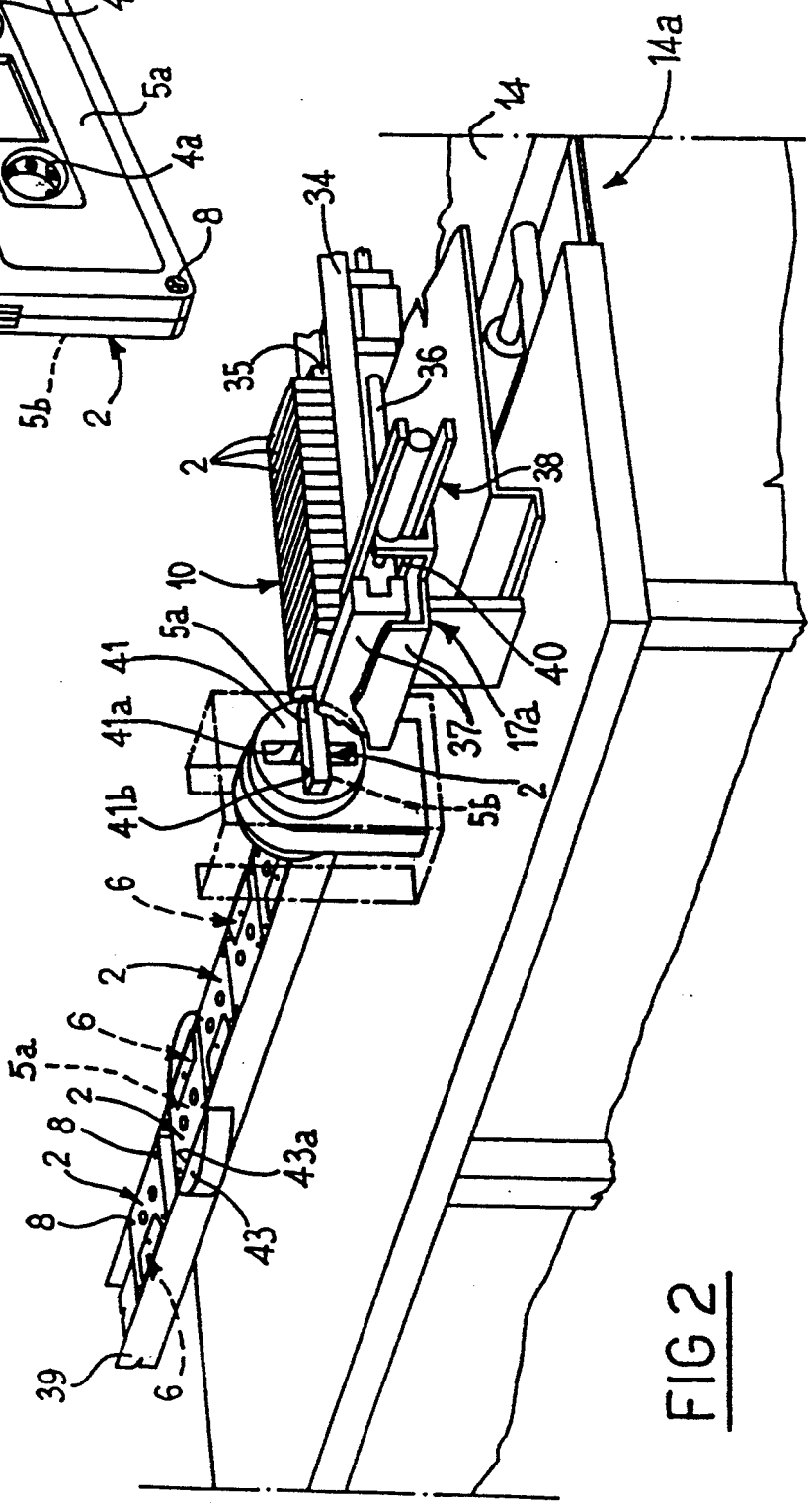
FIG. 2 is a fragmentary perspective view of the feed unit, taken from the opposite side with respect to FIG. 1.

As can be seen from FIGS. 1 and 2, the linear feeder 17 has a guide structure 34 arranged to slidably engage, at right angles to the longitudinal extension of the slide track 14, the cassette row 10 previously deposited by the transport arm 24. Advance means preferably consisting of at least a second pusher mechanism 35 movable along the guide structure 34 upon command of an actuator 36, causes the cassette row 10 to move toward an output end 17a of the feeder itself so that the cassette 2 at the head of the row is brought into abutment against a fixed locator 37. Operating at the output end 17a is transfer means 38 adapted to pick up, during each operating cycle, the cassette 2 acting on the fixed locator 37. This cassette is moved onto an output conveyor 39 so that one of its opposite faces (5a, 5b) alternately rests thereon. The conveyor extends parallelly to the slide track 14 and ends at the loading machine (not shown).

The transfer means 38 preferably comprises at least a third pusher mechanism 40 horizontally movable between a rest position in which it is not in contact with the cassette 2 located against the fixed locator 37, and an operating position in which the cassette is spaced apart sideways from the linear feeder 17. In greater detail, the cassette 2 submitted to the action of the third pusher mechanism 40 is engaged in a first rotating orientor 41 which positions it so that its faces 5a, 5b first disposed in a vertical orientation, are oriented horizontally when the cassette is placed on the output conveyor 39.

The first rotating orientor 41 has at least a first and a second engagement housing 41a, 41b, mutually crossing at a right angle, each of which, when oriented vertically, is adapted to engage the cassette 2 which is moved by the third pusher mechanism 40. Upon command of a motor (not shown), the first rotating orientor 41 is rotated through an angle of approximately 90° about a horizontal axis. Thereafter the cassette 2 is pushed out of the engagement housing 41a or 41b, when, due to a new operating cycle of the third pusher mechanism 40, a new cassette 2 is inserted into the other engagement housing 41b or 41a.

Preferably, the first rotating orientor 41 is selectively rotated in a clockwise or counterclockwise direction based on a signal from a first sensor 42 disposed close to the fixed locator 17 to identify the orientation of the fastening screws 8 provided in the cassette 2 in abutment on the locator. In particular, the first sensor 42, through the microprocessor, controls the rotation of the first rotating orientor 41 so that all cassettes 2 on the output conveyor 39 have their fastening screws 8 oriented in a predetermined direction.

With reference to FIG. 2, when the first sensor 42 detects the presence of screws 8 on the face 5a of a cassette 2 in abutment against the fixed locator 37, it causes the rotation orientor 41 to rotate in a clockwise direction when the cassette 2 is inserted into the corresponding engagement housing 41a or 41b. When the cassettes 2 are oriented in the opposite way, the first rotating orientor 41 rotates in a counterclockwise direction.

A second rotating orientor 43 can also be provided downstream of the first rotating orientor 41. The second orientor is provided with at least an engagement housing 43a for the individual cassettes 2 coming from the first orientor. The second orientor 43, disposed in coplanar relation with the first output conveyor 37, is rotatable about a vertical axis upon command of a second sensor 44, also disposed on the fixed locator 37, and arranged to identify the orientation of the access opening 6 of the cassette 2 coming into abutment with the locator. Based on data received from sensors 42, 44, the microprocessor selectively signals the rotation, through 180°, if the engaged cassette 2 is oriented in the opposite direction from the desired one. In this way, all the cassettes 2 on the output conveyor 39 will have their openings 6 oriented in a predetermined direction.

When the cassettes 2 have no fastening screws, it is sufficient to use the first orientor 41 to position the individual cassettes so that their openings 6 are oriented in a desired direction, based on data received from the second sensor 44.

The feed unit of the present invention permits a significant reduction in the manpower required for supplying cassettes to be sent to automatic loading machines. It should be noted that the only manual operation required with use of the present invention is the placement of stacked trays into the loading station. This operation is further simplified by the fact that filled trays are typically delivered already stacked. This enables a stock of empty cassettes to be arranged in the feed unit so that no human intervention is needed for a relatively long period of time. In the particular embodiment described, the storage station is capable of accommodating more than ten trays stacked one on top of the other. Since each tray typically contains about one hundred cassettes, it is possible to arrange more than one thousand cassettes in a very reduced space, in a single manual operation.

The above description of the invention is intended to be illustrative and not limiting. Modifications and variations may occur to one of skill in the art without departing from the spirit or scope of the invention.

What is claimed:

1. A tape cassette feed unit comprising:
   a linear feeder guiding a row of cassettes disposed consecutively in side-by-side relation;
   advance means associated with said linear feeder for moving the cassette row towards an output end of said feeder;
   transfer means for picking up one of the cassettes from said row and putting it onto an output conveyor;
   a storage station having a base, engaging a plurality of trays stacked one on top of the other, each said tray carrying a plurality of cassette rows disposed parallelly in side-by-side relation;
   a slide track extending horizontally from said storage station base towards said linear feeder;
   pusher means for moving the individual trays along said slide track, from said storage station to said linear feeder;
   stop means for stopping the progress of the individual trays on the slide track when one of said cassette rows reaches a predetermined pick-up position; and at least one transport arm operatively mounted above said slide track and said linear feeder, said arm moving between a grasp position in which it picks up a cassette row arranged in a pick-up position, to a deposit position in which said arm deposits the picked-up cassette row onto said linear feeder.

2. The unit as claimed in claim 1, wherein said linear feeder extends transversely to the slide track, in a position above the trays moving along the slide track.

3. The unit as claimed in claim 1, wherein said transport arm moves between the pick-up position and the deposit position in an oblique path with respect to a longitudinal extension of said slide track and linear feeder.

4. The unit as claimed in claim 1, wherein said transport arm comprises a supporting plate extending over said cassette row and carrying, at one end, at least a gripper element movable between a work position in which it acts on the cassette row to hold it against a locator relief and a rest position in which it is spaced apart from the cassette row to disengage it from said transport arm.

5. The unit as claimed in claim 1, wherein said transport arm is guided through at least a vertical guide fixedly carried by a carriage horizontally movable along a guide bar extending above said slide track and said linear feeder.

6. The unit as claimed in claim 5, wherein said guide bar extends horizontally in an oblique direction to a longitudinal extension of said slide track and said linear feeder.

7. The unit as claimed in claim 1, wherein combined with said storage station is a plurality of auxiliary supporting elements selectively movable between a rest position in which they are substantially retracted under said slide track, and an operating position in which they project vertically from said slide track for supporting the trays disposed in stacked relationship on top of the tray resting on the slide track and subject to action by said pusher means.

8. The unit as claimed in claim 7, wherein at least two pairs of said auxiliary supporting elements are provided, which elements are mutually spaced apart along a longitudinal extension of the slide track and individually movable from the rest position to the operating position.

9. The unit as claimed in claim 1, wherein associated with said storage station is at least an aligned element fastened to said slide track and exhibiting a vertically inclined lead-in surface, arranged to interact with a longitudinal lower edge of one of said trays in order to guide it against a locator element operating on the opposite side with respect to said aligned element.

10. The unit as claimed in claim 1, wherein said pusher means comprises at least one pusher mechanism projecting upwardly from said slide track and guided along one slot formed lengthwise in the slide track; and a control actuator located under the slide track and acting on said first pusher mechanism for moving it between a first and a second limit position.

11. The unit as claimed in claim 1, wherein said stop means comprises at least one horizontal abutment wall extending transversely above said slide track and arranged to offer an abutment seat for the cassette rows contained in the tray moved by said pusher means.

12. The unit as claimed in claim 1, further comprising an auxiliary locator bar extending horizontally above a cassette row which is located close to the row arranged in the pick-up position.

13. The unit as claimed in claim 1, wherein said linear feeder comprises a guide structure arranged to slidably engage the cassette row.

14. The unit as claimed in claim 1, wherein said transfer means comprises: a fixed locator disposed at said output end and arranged to offer an abutment seat for one of said cassettes located on said linear feeder; a third pusher mechanism horizontally movable between a rest position in which it is not in contact with the cassette located against said fixed locator, and an operating position in which said cassette is spaced apart sideways from the linear feeder; and at least one rotating orientor exhibiting at least a pair of engagement housings which are adapted to receive the cassette moved by the third pusher mechanism, said at least one rotating orientor being rotatable about a horizontal axis for orienting said cassette so that its faces are disposed in a horizontal direction.

15. The unit as claimed in claim 14, wherein said first rotating orientor can be selectively rotated clockwise and counterclockwise in response to a signal from at least one sensor arranged to identify the orientation of fastening screws on the cassette.

16. The unit as claimed in claim 15, further comprising a second rotating orientor located downstream of said first rotating orientor, including an engagement housing for engaging the cassettes coming from said first rotating orientor, said second orientor being rotatable about a vertical axis, in response to a signal from a second sensor arranged to identify the orientation of an access opening of the cassette.

17. The unit as claimed in claim 14, wherein said first rotating orientor can be selectively rotated clockwise and counterclockwise in response to a signal from a second sensor identifying the orientation of an access opening in each cassette.

* * * * *